United States Patent [19]

Polzin et al.

[11] Patent Number: 5,577,580
[45] Date of Patent: Nov. 26, 1996

[54] SAFETY SYSTEM IN A MOTOR VEHICLE EQUIPPED WITH AN AUTOMATIC TRANSMISSION

[75] Inventors: Norbert Polzin; Ulrich Gottwick, both of Stuttgart, Germany

[73] Assignee: Robert Bosch GmbH, Stuttgart, Germany

[21] Appl. No.: 299,357

[22] Filed: Sep. 1, 1994

[30] Foreign Application Priority Data

Sep. 4, 1993 [DE] Germany .................. 43 29 918.0

[51] Int. Cl.$^6$ ............................................. B60K 41/26
[52] U.S. Cl. .................. 192/4 A; 364/424.1; 477/92; 477/98
[58] Field of Search ................. 192/4 A, 9, 4 R; 364/424.1; 477/40, 92, 94, 98

[56] References Cited

U.S. PATENT DOCUMENTS

| | | | |
|---|---|---|---|
| 3,850,272 | 11/1974 | Reinecke et al. | 192/4 B |
| 4,039,061 | 8/1977 | Pruvot et al. | 192/4 A |
| 4,222,469 | 9/1980 | Kubolis et al. | 192/4 A |
| 4,696,380 | 9/1987 | Kita | 192/4 A |
| 4,724,726 | 2/1988 | Knecht | 192/4 CX |
| 5,361,207 | 11/1994 | Hayafune | 364/424.1 |
| 5,428,531 | 6/1995 | Hayafune | 364/424.1 |

FOREIGN PATENT DOCUMENTS

| | | |
|---|---|---|
| 4122083 | 12/1992 | Germany . |
| WO92/00212 | 1/1992 | WIPO . |

OTHER PUBLICATIONS

"Bosch Technische Berichte", vol. 7 (1983) No. 4, pp. 160 to 166.

Primary Examiner—Andrea L. Pitts
Attorney, Agent, or Firm—Walter Ottesen

[57] ABSTRACT

The invention relates to a safety system for a motor vehicle equipped with at least one braking system corresponding to a wheel unit. Furthermore, an automatic transmission system is provided which changes its ratio automatically based on specific shift criteria. A safety-relevant signal is generated in dependence upon a detection unit which detects states critical to safety of the brake system of the motor vehicle. According to the invention, the temperature of at least one brake system is applied for generating the signal relevant to safety. The shift criteria for the automatic transmission are changed in dependence upon this safety-relevant signal.

9 Claims, 2 Drawing Sheets

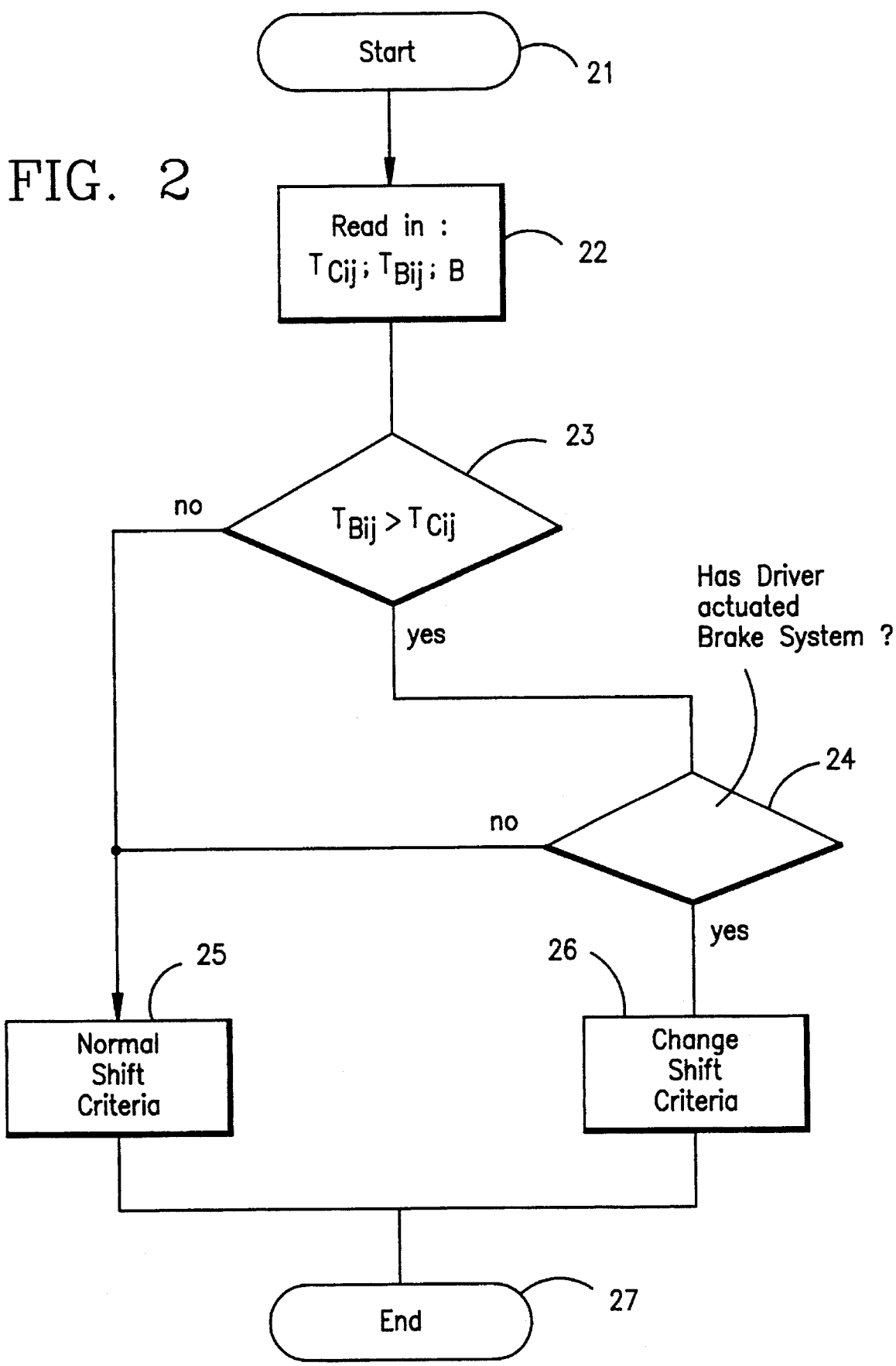

SAFETY SYSTEM IN A MOTOR VEHICLE EQUIPPED WITH AN AUTOMATIC TRANSMISSION

BACKGROUND OF THE INVENTION

It is known from the state of the art to configure a transmission for a motor vehicle as an automatic transmission. In addition to the purely hydraulically controlled automatic transmissions, ever greater use is made of electronic transmission controls for controlling the transmission. Such electronic transmission controls are, for example, disclosed in the technical journal entitled "Bosch Technische Berichte", Volume 7, (1983), Number 4, pages 160 to 166. In addition to automatic transmissions having several discrete ratio stages, automatic transmissions are also known wherein the ratio can be varied continuously. A method for operating a motor vehicle with a continuously adjustable transmission is, for example, disclosed in U.S. patent application Ser. No. 08/221,246, filed Mar. 31, 1994. Both versions of automatic transmissions have in common that, based on specific shift criteria, transmission ratios are changed automatically at least in dependence upon engine load and motor vehicle road speed.

A safety system for motor vehicles is disclosed in German patent publication 4,122,083 wherein the driver's attention is called to required downshifting before reaching the upper rpm limit when the motor vehicle is driving downhill and with a correspondingly high load. For this reason, the driver can achieve a deceleration of the motor vehicle with a timely downshift before the pregiven engine upper rpm limit is exceeded.

PCT patent publication WO 92/00212 discloses monitoring the temperature of the brakes in a motor vehicle. In this arrangement, a warning is issued when a limit temperature is reached and/or a drive slip control (ASR) is switched off and/or the engine torque is reduced by means of an engine intervention. The temperature is then determined by considering temperature increases in the braking case and in the ASR case and temperature reductions in the cooling phases.

SUMMARY OF THE INVENTION

It is an object of the invention to provide a safety system for a motor vehicle equipped with an automatic transmission wherein an operating state uncritical with respect to safety is provided in dependence upon a detection of a state of the braking system which is critical to safety.

The invention proceeds from a safety system for a motor vehicle having at least one braking system assigned to a wheel unit. Furthermore, an automatic transmission system is provided which automatically changes its ratios based on specific shift criteria. A safety-relevant signal is generated in dependence upon the detection of a safety-critical state of the braking system of the motor vehicle.

According to the invention, the temperature of at least one brake system is taken into account for generating the signal relevant to safety. The shift criteria for the automatic transmission are changed in dependence upon this safety-relevant signal.

It is especially advantageous to change the shift criteria in dependence upon the signal relevant to safety so that a transition is effected to such a ratio of the automatic transmission at which a greater engine drag torque is effected. Generally, a downshift operation is triggered when an increased brake temperature is detected.

A longer continuous actuation of the brake of the motor vehicle, for example, when driving through mountain passes, leads to an increased thermal load of the braking equipment which, in a critical case, can lead to a large reduction of the braking action. For motor vehicles with manual transmissions, the load can be reduced by shifting into a lower gear and therefore by utilizing the increased engine drag torque. The driver must select a lower gear stage in vehicles equipped with automatic transmissions in order to obtain the same effect. This manual operation is often omitted or forgotten because of a lack of knowledge of the possibility. The safety system of the invention affords the advantage of reducing the thermal load on the brake equipment without an input from the driver. The braking temperature can be determined indirectly based on a model computation as described in the above-mentioned state of the art or the braking temperature can be determined directly by measuring temperature. For motor vehicles equipped with electronic transmission control, a downshift to a lower gear is effected automatically as soon as possible when a characteristic temperature is reached at a brake in the case of a braking action wanted by the driver. By this operation, the engine drag torque is increased so that the braking equipment has to absorb less energy in the form of heat. The characteristic temperature must be separately determined for each brake of a vehicle type. The willingness to brake by the driver can be detected by a sensor such as a brake-light switch or a brake-pressure sensor.

For this purpose, according to the invention, the shift criteria for the automatic transmission are triggered in dependence upon the safety-relevant signal in such a manner that a downshift operation is triggered.

It is also advantageously provided that the shift criteria of the automatic transmission are changed in such a manner in dependence upon the safety-relevant signal S that a transition to a ratio of the transmission (that is, generally an upshift operation), which effects a reduced engine drag torque, is delayed or prevented.

Advantageously, the temperature of at least one brake system is compared to a pregiven threshold in order to generate the safety-relevant signal.

The brake temperature, which is determined by a model computation, can be determined in dependence upon at least one detected wheel rpm and from a signal indicating a braking operation. The temperature of a brake system can be detected directly by a sensor.

It is especially advantageous to configure the signal, which represents the temperature of the braking system, and/or the safety-relevant signal as a pulsewidth modulated signal. In this way, the receiver of this signal can differentiate between plausible or implausible signals (in the case of a fault: short circuit, interruption of a signal line) and react in a safety-directed manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
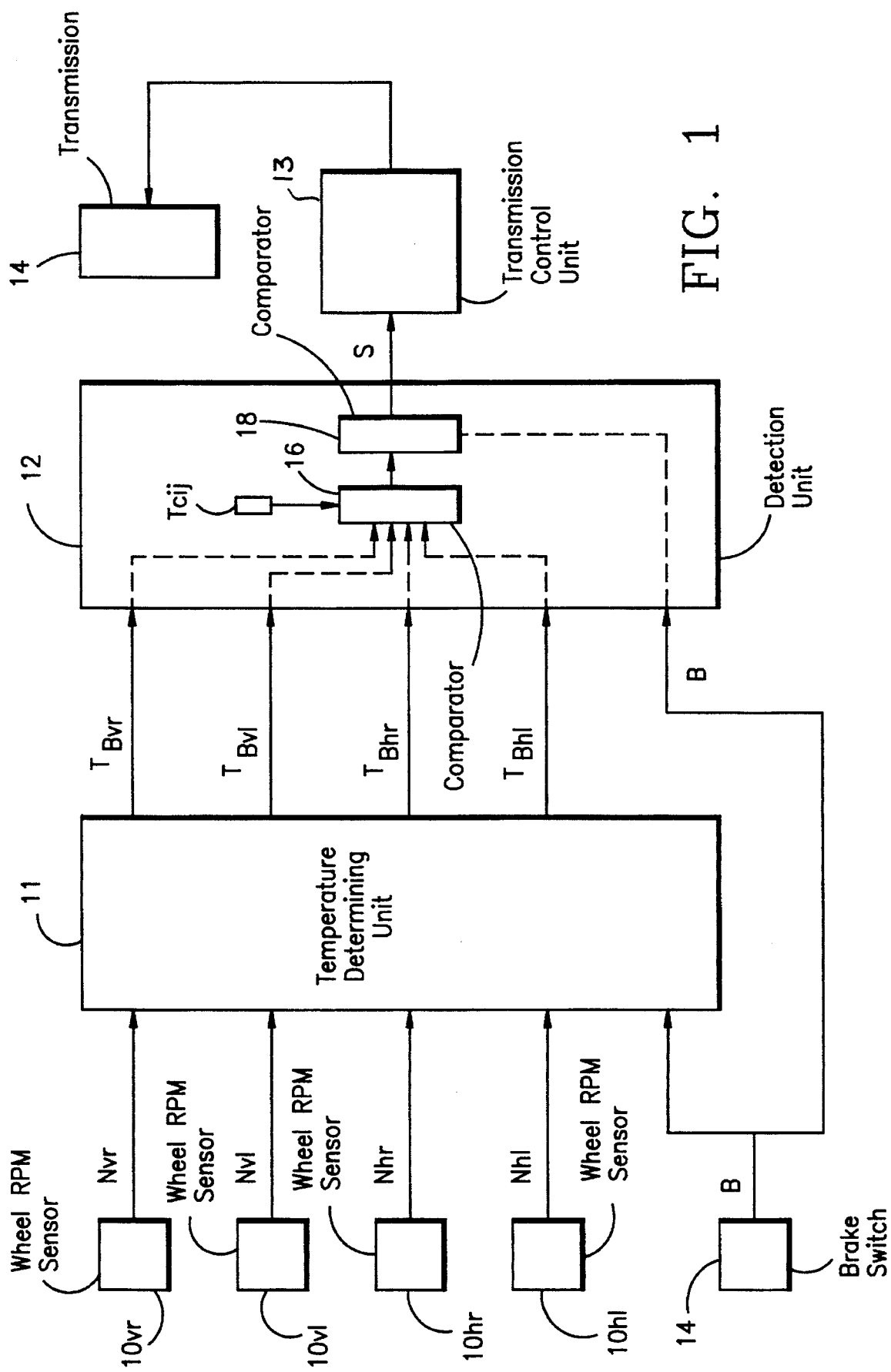
FIG. 1 is a block circuit diagram of the safety system according to the invention; and, FIG. 2 is a sequence block diagram or flowchart showing the operation of the safety system according to the invention.

Wheel rpm sensors $10vr$, $10vl$, $10hr$ and $10hl$ are shown in FIG. 1 for providing measured values. Wheel rpm sensors of this kind are known from the state of the art and can be, for example, so configured that round metal discs are mounted at the wheel units centrically with respect to the wheel axes. The edges of these discs are provided with cutouts all of the same size and disposed equidistantly from each other. A realistic number of cutouts is, for example, 48. A signal having a rectangular waveform is obtained by scanning these toothed wheels, for example, by utilizing inductive sensors and a first signal processing unit for forming the sensor signals and for eliminating noise signals.

The following is based on a motor vehicle having four wheels with the index combination indicating the particular wheel. The first index i indicates whether the particular variable or the sensor is located forward (i=v) or rearward (i=h). The second index j indicates whether the variable is to be assigned to the right (j=r) or to the left vehicle half (j=l).

The rpm sensor units $10ij$ then emit wheel rpm numbers Nij which are supplied to the temperature determining unit 11. Furthermore, the signal B of a brake switch 14 actuated by the driver is applied to the temperature determining unit 11. The operation of the temperature determining unit 11 is disclosed, for example, in PCT patent publication WO 92/00212. The four signals $T_{Bij}$, which represent the actual brake temperatures, are present at the output end of the temperature determining unit 11. These signals are then supplied to the detection unit 12 for detecting a state critical to safety. The detection unit 12 compares the brake temperatures $T_{Bij}$ to a corresponding characteristic temperature $T_{Cij}$. If at least one characteristic temperature is exceeded and the brake system is actuated at the same time, then the detection unit 12 emits a safety-relevant signal S to the electronic transmission control unit 13. The shift criteria are then changed on the basis of this request in such a manner that the particular drive stage of the stepped transmission 14 is selected with the largest engine drag torque.

If the safety-relevant signal S and the four signals representing the brake temperatures $T_{Bij}$ are configured as pulsewidth modulated signals, then, in the electronic transmission control unit 13 and in the detection unit 12, the signals can be monitored as to permitted signal forms. In this way, plausible and implausible signals (in the case of a fault: short circuits, interruptions of the signal line) can be differentiated and appropriate reactions take place to achieve safety.

A flowchart is shown in FIG. 2 which shows the operation of the detection unit 12 which includes a comparator 16 and a comparator 18. After the startling step 21, the characteristic temperature $T_{Cij}$, the actual brake temperature $T_{Bij}$ and the signal B of the brake-light switch 14 are read in step 22 for each wheel.

A determination is made in block 23 as to whether the computed brake temperature $T_{Bij}$ is greater than a fixed characteristic or pregiven threshold temperature $T_{Cij}$. If this is the case, then an inquiry is made in step 24 as to whether the driver has actuated the braking system (for example, by actuating the brake-light switch, signal B). In the case of an actuation, the shift criteria for changing the ratio of the automatic transmission are changed in step 26 so that, as long as possible (for example, the engine rpm limits must be observed), the driving stage is selected and, as soon as possible, shifting into the driving stage having higher engine drag torque takes place.

If the result of inquiry 23 is that the computed brake temperature $T_{Bij}$ does not exceed the characteristic temperature $T_{Cij}$, then, in step 25, the normal shift criteria are pursued further. The program starts again with step 21 after the end step 27.

The safety system of the invention affords tile advantage that the thermal loading of the braking system is reduced by utilizing available signals by means of an additional logic in motor vehicles which are equipped with an antiblocking system (ABS) or with an antislip system (ASR) as well as an electronic transmission control.

It is understood that the foregoing description is that of the preferred embodiments of the invention and that various changes and modifications may be made there to without departing from the spirit and scope of the invention as defined in the appended claims.

What is claimed is:

1. The combination of a safety system and a motor vehicle equipped with at least one braking system corresponding to a wheel unit and equipped with an automatic transmission which automatically changes the transmission ratio thereof in response to changes in shift criteria, the combination comprising:

temperature determining means for determining the temperature ($T_{Bij}$) of said braking system;

circuit means for generating a safety-relevant signal (S) based upon said temperature ($T_{Bij}$); and, transmission control means for changing said shift criteria in response to said signal (S).

2. The combination of claim 1, wherein said shift criteria is changed in dependence upon said signal (S) so as to cause a transition in said transmission ratio which effects a greater motor drag torque.

3. The combination of claim 1, wherein said automatic transmission is a stepped transmission; and, said shift criteria is changed in dependence upon said signal (S) so as to cause a downshift operation to be triggered in said stepped transmission.

4. The combination of claim 1, wherein said shift criteria are changed in dependence upon said signal (S) so that a prevention occurs of a transition to a transmission ratio which effects a lesser motor drag torque.

5. The combination of claim 1, said circuit means comprising a comparator for comparing said temperature ($T_{Bij}$) to a pregiven threshold ($T_{Cij}$) to generate said signal (S).

6. The combination of claim 1, further comprising:

wheel rpm sensor means for providing a wheel rpm signal (Nij);

brake switch means for providing a brake signal (B) indicative of an actuation of said braking system; and, said temperature determining means including means for determining said temperature ($T_{Bij}$) in dependence upon said wheel rpm signal (Nij) and said brake signal (B).

7. The combination of claim 1, said temperature determining means comprising sensor means for detecting said temperature ($T_{Bij}$).

8. The combination of claim 1, wherein at least one of said temperature ($T_{Bij}$) and said signal (S) are configured as pulsewidth modulated signals.

9. The combination of claim 1, wherein said shift criteria are changed in dependence upon said signal (S) so that a delay occurs of a transition to a transmission ratio which effects a lesser motor drag torque.

* * * * *

UNITED STATES PATENT AND TRADEMARK OFFICE
CERTIFICATE OF CORRECTION

PATENT NO. : 5,577,580

DATED : November 26, 1996

INVENTOR(S) : Norbert Polzin and Ulrich Gottwick

It is certified that error appears in the above-identified patent and that said Letters Patent is hereby corrected as shown below:

In column 1, lines 19 and 20: delete "patent application serial number 08/221,246, filed March 31, 1994." and substitute -- Patent 5,514,050. -- therefor.

In column 3, line 48: delete "startling" and substitute -- starting -- therefor.

In column 4, line 3: delete "tile" and substitute -- the -- therefor.

In column 4, line 12: delete "there to" and substitute -- thereto -- therefor.

In column 4, line 30: delete "is" and substitute -- are -- therefor.

UNITED STATES PATENT AND TRADEMARK OFFICE
CERTIFICATE OF CORRECTION

PATENT NO. : 5,577,580

DATED : November 26, 1996

INVENTOR(S) : Norbert Polzin and Ulrich Gottwick

It is certified that error appears in the above-identified patent and that said Letters Patent is hereby corrected as shown below:

In column 4, line 35, delete "is" and substitute -- are -- therefor.

Signed and Sealed this

Sixteenth Day of September, 1997

*Attest:*

BRUCE LEHMAN

*Attesting Officer*     *Commissioner of Patents and Trademarks*